United States Patent [19]

Newton

[11] 4,114,600
[45] Sep. 19, 1978

[54] THERMAL STORAGE AND HEAT TRANSFER SYSTEM AND METHOD

[75] Inventor: Alwin B. Newton, York, Pa.

[73] Assignee: Solation Products, Inc., York, Pa.

[21] Appl. No.: 730,212

[22] Filed: Oct. 6, 1976

[51] Int. Cl.² .......................... F28D 21/00; F24J 3/02
[52] U.S. Cl. .................................. 126/271; 126/400; 165/104 S
[58] Field of Search ............... 165/104 S, DIG. 4, 10; 126/400, 271

[56] References Cited

U.S. PATENT DOCUMENTS

| 2,342,211 | 2/1944 | Newton ........................ 165/104 S X |
| 2,499,043 | 2/1950 | Voorhees ...................... 165/DIG. 4 |
| 3,107,052 | 10/1963 | Garrison ........................ 126/271 X |
| 3,200,877 | 8/1965 | Lehmer et al. ................ 165/104 S X |
| 3,289,743 | 12/1966 | Biro .................................. 165/10 |
| 4,044,949 | 8/1977 | Morawetz et al. ............ 126/400 X |

*Primary Examiner*—Albert W. Davis, Jr.
*Attorney, Agent, or Firm*—C. Hercus Just

[57] ABSTRACT

A thermal storage and heat transfer system for use with a solar energy heat collector comprising a tank having a plurality of temperature zones therein each zone having, preferably, a plurality of layers of closely arranged cells of irregular shape occupying a minimum space to provide a maximum number of cells in said space in a manner to provide ample passages between the cells for a liquid heat transfer medium to contact and move past appreciable surface areas to effect heat transfer to and from said medium, said cells in said zones respectively having sealed therein different heat storage mediums of a nature to develop a substantially constant latent heat of fusion temperature when changing from liquid to solid state at a predetermined temperature, and a pump connected to said tank and operable to circulate said heat transfer medium through said passages from and to a solar heat collector. The prefered shape of said cells is a tetrahedron or a similar simple solid geometric configuration.

17 Claims, 10 Drawing Figures

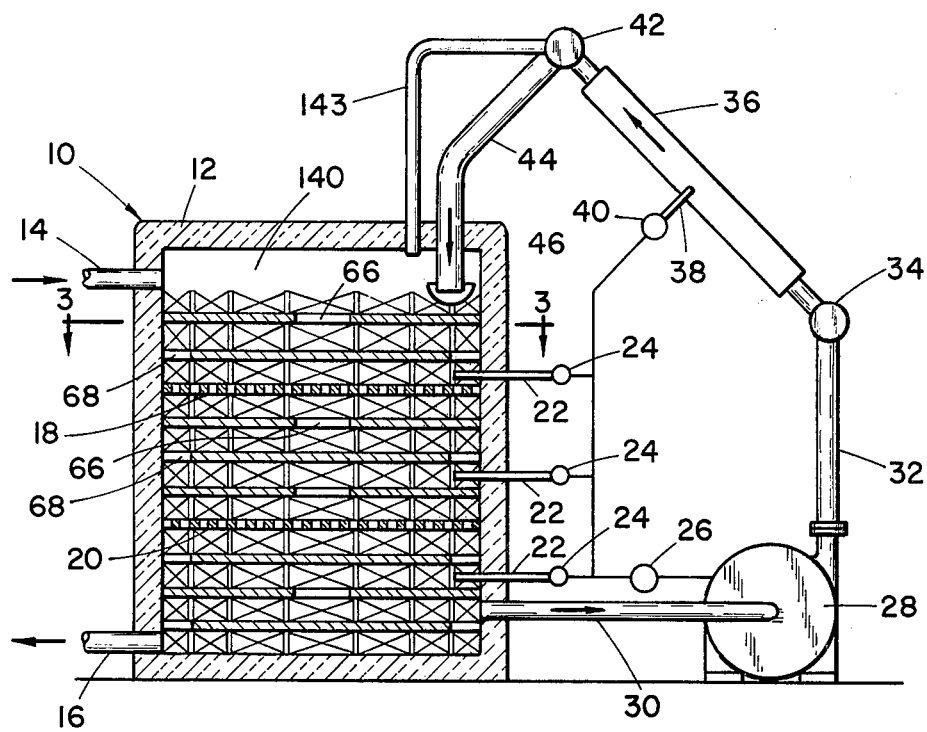
FIG. 1
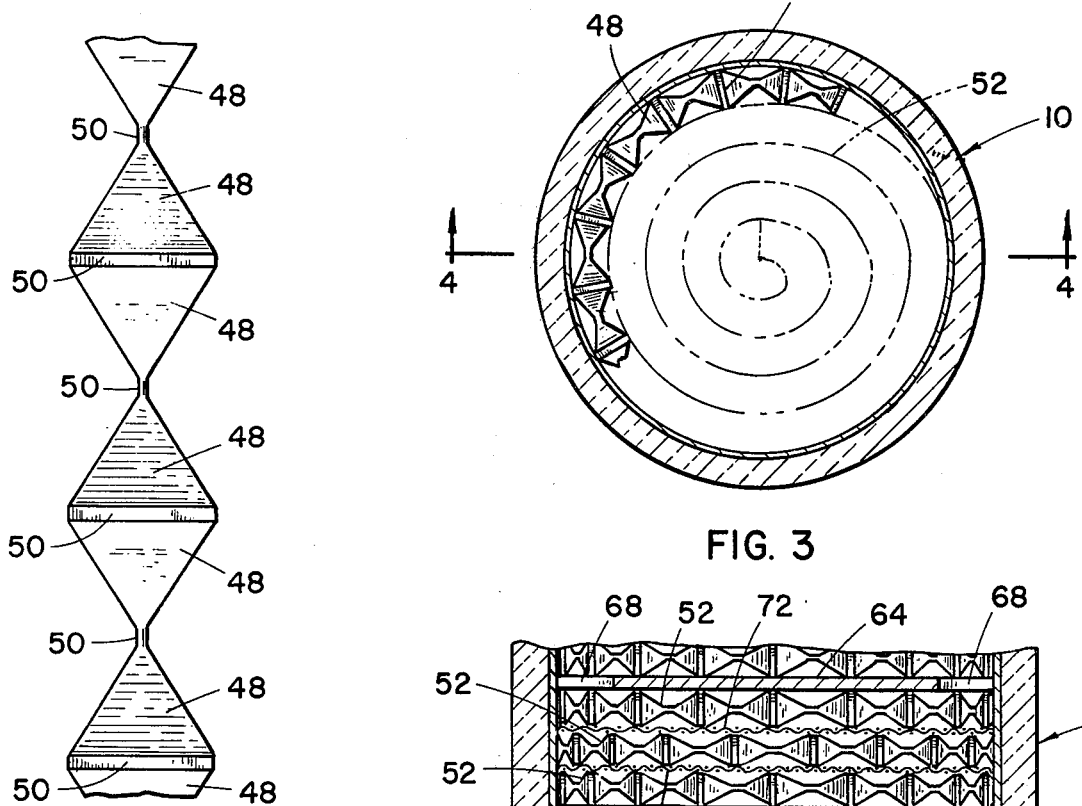
FIG. 2
FIG. 3
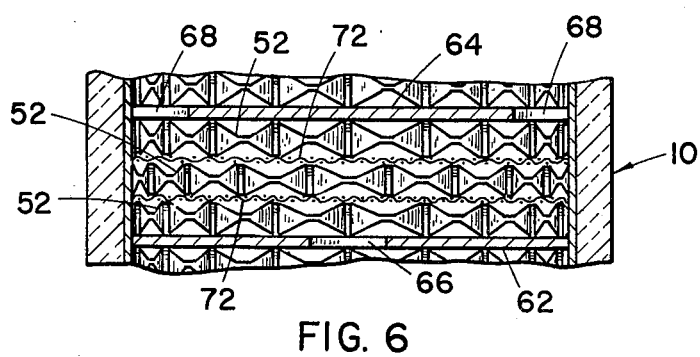
FIG. 6

THERMAL STORAGE AND HEAT TRANSFER SYSTEM AND METHOD

BACKGROUND OF THE INVENTION

The utilization of solar energy for space heating and cooling has been the subject of various developments for a substantial period of time. Until the recent energy crisis which occured due to scarcity of oil for heating purposes and generation of electric current, practical adaptation of solar energy for heating and cooling, and particularly the actual employment thereof for such purposes, was not seriously undertaken. Now that suitable substitutes for oil and other petroleum products as sources of energy are being considered seriously, the availability of solar energy for such purposes is very apparent. After the initial installation of a system to employ this form of energy, operation of the same is relatively inexpensive, even when supplemental electrical energy is required to augment solar energy to provide a full schedule of operation of the system.

Various types of solar heat collector systems have been developed heretofore and some of these have now been placed in operation. While not directly related to the present invention, except as an example of one type of solar energy collector system, the present applicant has a co-pending application, Ser. No. 657,883, filed Mar. 4, 1976 and entitled Solar Heat Collector, this collector being suitable for use with the thermal storage and heat transfer system and method comprising the present invention. In some thermal storage and heat transfer systems which have been developed heretofore, heat exchange apparatus has been used in which the heat storage medium which is heated by the solar heat collector, and is circulated through the thermal storage system, comprises water. Similarly, the heat transfer medium also comprises water. Depending upon the type and amount of insulation associated with the system and especially the storage tank, water is relatively useful as a heat storage medium but it is possible to improve the usefulness of a thermal energy storage system by utilizing a heat storage medium in the form of a chemical substance or compound capable of changing from liquid to solid state at a predetermined temperature and thereby developing latent heat of fusion at said temperature which is substantially constant. The principle of deriving such latent heat of fusion from various chemical compound and substantces is well known but, thus far, relatively little use of the same in association with thermal storage system has been undertaken. The present invention, however, utilizes this principle to distinct advantage in association with apparatus structure and the method performed by such structure, details of which are set forth hereinafter.

SUMMARY OF THE INVENTION

It is the principal object of the present invention to provide a thermal storage and heat transfer system which employs solar energy as the source of heat for purposes of heating a liquid heat transfer medium, such as water, into and through a tank in which a plurality of heat storage cells of irregular shape are positioned immediately adjacent each other in very compact relationship and in which, due to the irregular shape of said cells, highly adequate and substantial passages are provided in said tank between said cells for the circulation of said liquid heat transfer medium therethrough in contact with the exterior surfaces of said cells, the cells having sealed therein a heat storage medium comprising a chemical capable of changing from liquid to solid state to develop latent heat of fusion at a predetermined, substantially constant temperature so that, when the heat transfer medium such as water is initially heated to a temperature by the solar heat collector which is above the melting point of the heat storage medium and the temperature of the transfer medium decreases by use to a temperature less than said melting point, the solidification of said heat storage medium produces a substantial amount of useful auxilliary heat comprising the latent heat of fusion of said heat storage medium.

It is another object of the invention to provide several different types of storage tanks and arrangements in said tanks in which the aforementioned phenomenon is utilized in a highly efficient manner.

Ancillary to the foregoing object, it is a further object to provide in said storage tanks several different arrangements of zones in which the heat storage medium employed respectively in said zones in different in order that different temperature ranges may be developed in said zone for the purposes described hereinafter, all leading to efficient operation of the system.

One further object of the invention is to encapsulate the desired heat storage medium in closely associated, and preferably physically connected, cells in which the heat storage medium is sealed and, related to this object, it is a still further object to employ cells which are in the shape of tetrahedrons which, for example, may be formed from flexible tubular plastic material capable of having opposite walls thereof squeezed together by heated means capable of causing sealing adherance of said opposite walls so as effectively to enclose a selected heat storage medium within said cells by relatively simple apparatus, the resulting product comprising a series of tetrahedrons when successive sealing compressions of the tube at selected interval are at right angles to each other, a further attribute of such formation being that alternate sealing areas in the continuous arrangement thereof are capable of functioning as hinge sections, whereby a predetermined continuous length of such tetrahedrons may be arranged in a coiled configuration substantially within a common plane and provide ample passages between adjacent convolutions of said tetrehedrons for the passage of liquid heat transfer medium, such as water, through said passages.

Still another object of the invention is to arrange said aforementioned coiled arrangements of tetrahedrons in layers which are either immediately on top of each other, separated by perforated diaphragms, or separated by substantially imperforate diaphragms successively having openings therein in different locations to effect a circuitous path for the liquid heat transfer medium, such as water, between successive layers of said coiled cells containing the heat storage medium.

Ancillary to the foregoing object, is a further object of the invention in utilizing relatively imperforate diaphragms to provide successive diaphragms respectively with a passage opening in the center and one or more passage openings adjacent the periphery thereof, whereby when each of the diaphragms is thus arranged, an effective circuitous path for the liquid heat transfer medium is provided between said layers of coiled cells.

A still further object of the invention is to provide in one embodiment a tank in which two or more zones are provided by means of relatively imperforate horizontal plates extending transversely between opposite sides of said tank, circulation of liquid transfer medium between said zones and the solar heat collector may be effected by sets of elongated tubes comprising inner and outer tubes, one of said tubes having one opening located therein for each zone and the other tube having a plurality of circularly spaced openings therein at a plurality of levels corresponding to the spacings of the openings in the first mentioned tube, whereby when the tubes are relatively rotated about their axes, said opening in the respective tubes form valve means to control the distribution and circulation of the liquid heat transfer medium between said zones and said solar heat collector.

It is still another object of the invention to arrange sensor devises in each zone of said tanks, said sensors operating thermal switches connected in circuit with an electric motor which operates a circulating pump for the liquid heat transfer medium and thereby automatically provides for circulation of said medium within any zone of said tanks in which the sensor has activated the pump for purposes of circulating said heat transfer medium to and from said zone and the solar heat collector for purposes of raising the temperature in the heat storage cells in said zone.

A further object of the invention is to operate the system in a manner by which a space is provided in the upper portion of the storage tank to accommodate a preferably inert gas which is vented to the upper end of the solar heat collector in the system in order that the liquid heat transfer medium may be drained from the collector and transferred to the tank either each time the circulating pump stops or under circumstances where the ambient temperature surrounding the solar heat collector would be such as to result in a temperature which is below the freezing temperature and the liquid heat transfer medium is water.

Still another object of the invention is to provide a method of storing solar heat temperature and utilizing it to provide a liquid heat transfer medium for space heating by providing a heat storage medium sealed within a series of closely related cells and operable to change from liquid to solid state to yield latent heat of fusion at a substantially constant selected temperature, the cells having an irregular shape and closely packed in a minimum space with passages therebetween to permit ready and substantial circulation of a constantly liquid heat transfer medium to absorb said latent heat of fusion to raise the temperature of said medium and conducting the heated transfer medium to a space heating or cooling unit to provide the heat for said unit.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a vertical elevation of a somewhat schematic type, partly in vertical section, illustrating one embodiment of thermal storage and heat transfer system which includes principles of the present invention.

FIG. 2 is a fragmentary side elevation of a section of cells employed to contain heat storage medium in sealed relationship and comprising a string of connected tetrahedrons.

FIG. 3 is a horizontal sectional view of the system shown in FIG. 1 as seen on the line 3—3 thereof, the illustration in FIG. 3 being on a larger scale than in FIG. 1.

FIG. 6 is a fragmentary vertical sectional view of a further embodiment of the invention and illustrating a portion thereof similar to that illustrated in FIG. 4.

DETAILED DESCRIPTION

Figure 4:
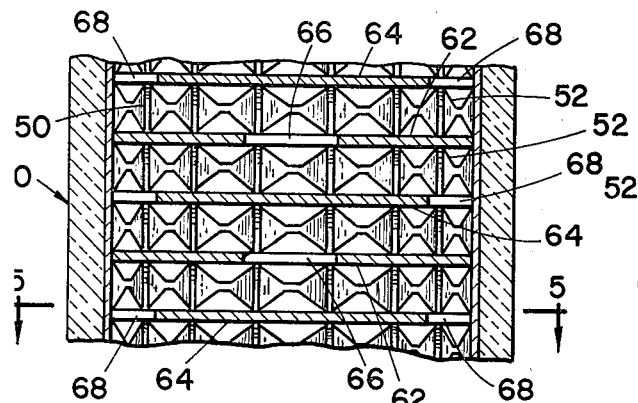
FIG. 4 is a fragmentary vertical section of the part of the system shown in FIG. 3 as seen on the line 4—4 thereof.
Figure 5:
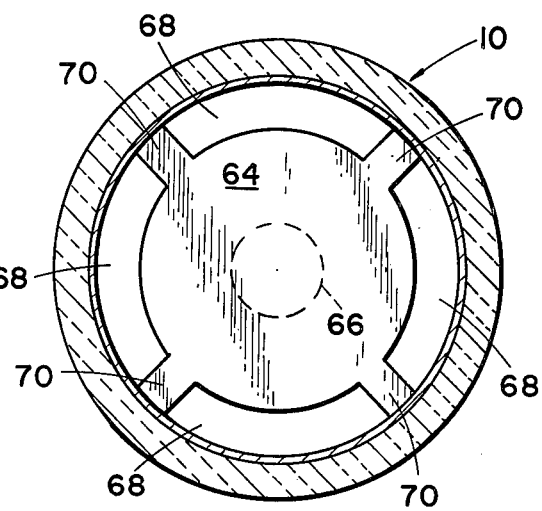
FIG. 5 is a horizontal sectional view of the part of the system shown in FIG. 4 as seen on the line 5—5 thereof.

The purpose of the present invention is to provide a thermal storage and heat transfer system and method which yields maximum usefulness incident to storing heat generated by solar energy applied against a solar heat collector. In particular, the present invention is directed to apparatus which arranges suitable heat storage medium in irregular cells capable of being arranged in minimum space with a maximum number of said cells so arranged that even in such compact disposition of said cells, there is provided ample passages between the cells for circulation of liquid heat transfer medium, such as water, between and over the surfaces of said cells so as to effect desired heat transfer between said cells and said liquid heat transfer medium, which medium then is circulated to a space heating or cooling system, depending upon the use desired. The irregular shape of the cells is largely responsible for acheiving the desired objectives and purposes of the invention and, in addition, the tanks comprising the storage enclosures are also provided with several different embodiments of zones within the tank, said zones containing cells having heat storage medium therein respectively of different melting points so as to further increase the efficiency and the usefulness of the several systems which include the basic principles of the present invention.

Another purpose of the invention is to utilize the phennomenon of latent heat of fusion derived from heat storage mediums within the cells being cooled through circulation of the heat transfer medium and transforming the heat storage medium to solid condition, which phenomenon produces such latent heat of fusion, said heat being utilized to increase the temperature of the heat transfer medium, thereby rendering the system much more efficient than those systems in which the principal of latent heat of fusion is not employed, such as, for example, where the heat storage medium is water, or a similar substance.

Referring to FIG. 1, there is illustrated therein, somewhat diagrammatically, one embodiment of thermal storage and heat transfer system which employs the principals of the present invention. In said figure, there is illustrated a tank 10 of suitable size and capacity, commensurate with the space to be heated or cooled thereby. For example, said tank may be cylindrical and have a horizontal top and bottom tightly connected thereto, the tank also being covered with insulation material 12 of appropriate type and thickness. At one side of the tank, near the top, one end of a return conduit 14 is shown fragmentarily and, adjacent the bottom of the tank, a similar showing of an exit or discharge conduit 16 is shown, both of said conduits communicating with the interior of tank 10 and said conduits also being the means by which liquid heat transfer medium, such as water, is carried to and from either a space heating plant or system, or a space cooling plant or system, depending upon the application of the heat contained in said heat transfer medium.

Within the tank 10, an exemplary number of horizontal perforated diaphragms 18 and 20 are shown. Said diaphragms may be of metal, preferably rigid synthetic resin or plastic, or otherwise and the perforations therein preferably are substantially uniformly spaced throughout the areas so as to provide relatively ready transmission of liquid heat transfer medium between the various zones within the tank 10 which are formed by the perforated diaphragms 18 and 20. These various zones also preferably have heat sensor tubes or rods extending thereinto and heat-responsive heads 24 thereon are of a suitable, commercial electric nature and are connected in circuit with a switch 26 which controls the operation of a motor-centrifugal pump unit 28. The pump of unit 28 is connected by a conduit 30 to the interior of the lower portion of tank 10 for the reception of heat transfer medium therefrom which is pumped through delivery conduit 32 to a header 34 on the lower end of a solar heat collector 36 which, in this embodiment of the invention, is preferably disposed at an elevation above the upper end of the tank 10. If desired, the heat collector 36 also may have a sensor tube or rod 38 extending thereinto, having a heat responsive head 40 thereon that is connected in circuit with the heat responsive heads 24 of the heat sensor tubes or rods 22. The function of these various sensors is described hereinafter.

The upper end of solar heat collector 36 communicates with an upper header 42 and said header has a delivery conduit 44 communicating therewith, the lower end thereof extending into the upper end of tank 10 for delivery of heated heat transfer medium thereto. To effectively distribute the discharge from conduit 44, the same has an appropriate spreader 46 illustrated in exemplary manner in FIG. 1 and known in the trade as a "mushroom".

HEAT STORAGE MEDIUM AND FUNCTION

Each of the zones referred to within tank 10 are provided preferably with a plurality of layers of closely arranged and preferably connected cells which are of irregular shape and the preferred form thereof as illustrated in exemplary manner in FIG. 2, comprises a series of tetrahedrons 48. One preferred type of such cells comprises the utilization of a plastic tube of suitable diameter such as, for example, one inch or more and having appropriate wall thickness to be durable and long lasting. Suitable plastics such as Alathon and Nylon are thermo-plastic and capable of having the ends or midportions thereof sealed together by fusion. One suitable method of forming the cells 48 is to compress narrow sections of opposite walls of the tube into flat abutting relationship and, by the application of heat applied to the pressing members, narrow connecting strips 50 are formed, certain of which serve as hinges due to the flexible nature thereof, for purposes of forming a predetermined length of the connected cells 48 into a spiral configuration 52 which preferably comprises a spiral layer of a plurality of the cells 48 connected in continuous manner between the opposite ends of the selected strip thereof used to form said spiral 52.

The principal purpose for utilizing a tetrahedron as the configuration for the cells 48 is that they are of a such an irregular nature that when a continous length of connected cells of suitable length are formed into a spiral so that at least certain of the cells somewhat interfit with relation to each other, there nevertheless is only a very minimum amount of surface contact of any appreciable size between adjacent cells, whereby in accordance with the principle of the invention, ample passages are provided between adjacent cells for the transmission of liquid heat transfer medium between the cells for intimate contact thereof with the cells to effect desired heat transfer therebetween. Thus, it will be seen that one of the principal objectives of the present invention is achieved, namely, a maximum amount of heat storage medium, which is contained within said cells, is arranged in a minimum space while affording ample passages between the cells for the circulation of heat transfer medium therebetween.

Many different kinds of heat storage mediums are available for enclosure within the cells 48 and a limited list of such mediums are set forth below for illustrative purposes, it being understood that the present invention is not restricted to the use of these only. However, in view of the fact that the preferred liquid heat transfer medium to be employed with the present invention is water, and due further to the fact that another objective of the present invention is to utilize the phenomenon of latent heat of fusion inherent in the mediums encased within the cells 48, the mediums selected should be those which have a melting point below the boiling point of water and above the freezing point thereof. It will be seen that the exemplary table of mediums set forth below are within the stated ranges.

| TYPICAL HEAT STORAGE MEDIUMS | | |
|---|---|---|
| Chemical Compound | Melting Pt. (Approx.) Centigrade-Fahrenheit | Latent Heat of Fusion |
| Acenaphthene | 95° 203° | |
| Fructose | 94° 201° | |
| 1-Nephthol | 94° 201° | 68 |
| Aspirin | 90° 194° | |
| Barium Hydroxide | 82° 180° | 114.3 |
| Palmetic Acid | 64° 147° | |
| Cyclohexane | 64° 147° | 79.8 |
| Borontriethyl | 60° 140° | |
| Lauric Acid | 49° 120° | 79.3 |
| Polyglycol-E-400 | 8;20 46.4° | 42.8 |

Another advantage relative to the irregular shape of the cells 48 afforded by the tetrahedron configuration is that the walls of the cells are capable of being expanded a limited extent as, for example, when the contents thereof change between liquid and solid form. This is effected without rupture of the walls of the cells or the seals between adjacent cells.

There are several exemplary ways in which the cells 48 may be filled with heat storage medium. Assuming that the medium selected will not wet the inner surface of the tube, one end of the tube may be sealed by heat and pressure and the medium introduced into the other end of the tube, such as while it is being held substantially vertically. Beginning adjacent the sealed end of the tube, pressure and heating jaws may progressively be moved into abutting relationship to form the sealed strips 50, successively at right angles to each other so as to form the tetrehedrons therebetween. This is continued until a sufficient continuous length of the transformed tube has been formed into a continuous series of tetrehedrons filled with heat storage medium and sealed from each other.

Figure 10:
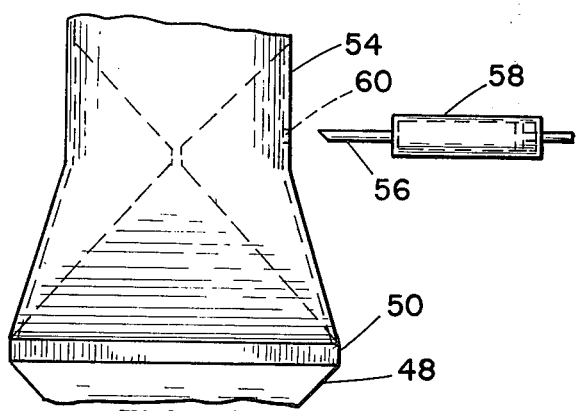
FIG. 10 is a fragmentary vertical elevation illustrating one embodiment of exemplary means to fill the cells with heat storage medium to produce the arrangement shown in FIG. 2.

Under circumstances where the heat storage medium would be capable of wetting the inner surface of the plastic tube, another possible way of filling the cells is illustrated in exemplary manner in FIG. 10, wherein the plastic tube 54 is shown with a preceeded sealed strip 50 formed at the top of the lower cell 48. An injection needle 56 on one end of a hypodermic-type cylinder and piston unit 58 filled, for example, with a measured charge of heat storage medium, is injected into the tube at a predetermined location 60, after which the opposite side walls are squeezed together in the region of the injection opening 60 and heat is applied to seal the same together to form the exemplary narrow strip 50, shown in phantom in FIG. 10, said strip including that portion of the tube in which the injection 60 was made so that no leakage will occur. Successive injections progressively up the full length of the tube then are undertaken until the desired length of filled cells is obtained for arrangement into coiled layers or other appropriate configurations, in accordance with the principles of the invention.

CIRCULATION ARRANGEMENTS IN THE TANK

In addition to the zones formed in the tank, as described above, by means of the horizontal perforated diaphragms 18 and 20, it is further contemplated by the present invention that individual spiral configurations 52 may be disposed between preferably thin horizontal diaphragms 62 and 64 which are imperforate and, for example, may be formed from sheets of metal or plastic. As shown in FIG. 4, the diaphragms preferably extend to the inner walls of the tank 10 but need not be connected thereto. Incidentally, another virtue of the tetrehedron shapes of the cells 48, when they are disposed in coiled form and are filled with heat storage medium, they possess substantial rigidity capable of withstanding appreciable vertical pressure, due particularly to the sealed strips 50 comprising hinge-like means between adjacent cells. This arrangement also can be appreciated from FIG. 4.

To increase the circulating ability afforded by the diaphragms 62 and 64, it will be seen that the diaphragms 62 are provided with a central opening 66, while the intermediate diaphragms 64 are provided with arcuate peripheral openings 68, separated by projections 70 which extend to the inner surface of the tank 10.

The foregoing arrangement of alternate diaphragms 62 and 64, respectively having central openings and peripheral openings, cause the heat transfer medium to assume a circuitous path with respect to the successive layers of the cells and this also results in substantial efficiency in effecting overall heat transfer between the heat storage medium in the cells 48 and the heat transfer medium which is circulating between the compactly arranged cells by means of the passages between said cells.

Still another mounting and positioning means for the layers of cells comprising the preferred spiral configurations 52 is illustrated in FIG. 6. It will be seen therein that an exemplary three layers of spiral configurations 52 of the cells 48 are disposed in stacked relationship between a pair of successive diaphragms 62 and 64. In the illustration shown in FIG. 6, it will be seen that circular sheets of wire mesh 72 are disposed between the successive layers of spiral configurations 52 which will prevent the cells of the layers from meshing with each other and thus provide a less compact engagement of the successive layers with each other as compared with the situation where no such mesh is employed but, by using the mesh, a greater amount of circulation space is provided through which the heat transfer medium may circulate.

In the arrangement shown in FIG. 1, zones are provided between the perforated diaphragms 18 and 20. Accordingly, relatively free circulation is permitted between said zones in which the heat storage medium in each zone respectively have different melting points. In accordance with the present invention however, referring to FIG. 7, it will be seen that a plurality of zones which are more completely separated may be provided in the tank and details of the same are as follows.

Figure 7:
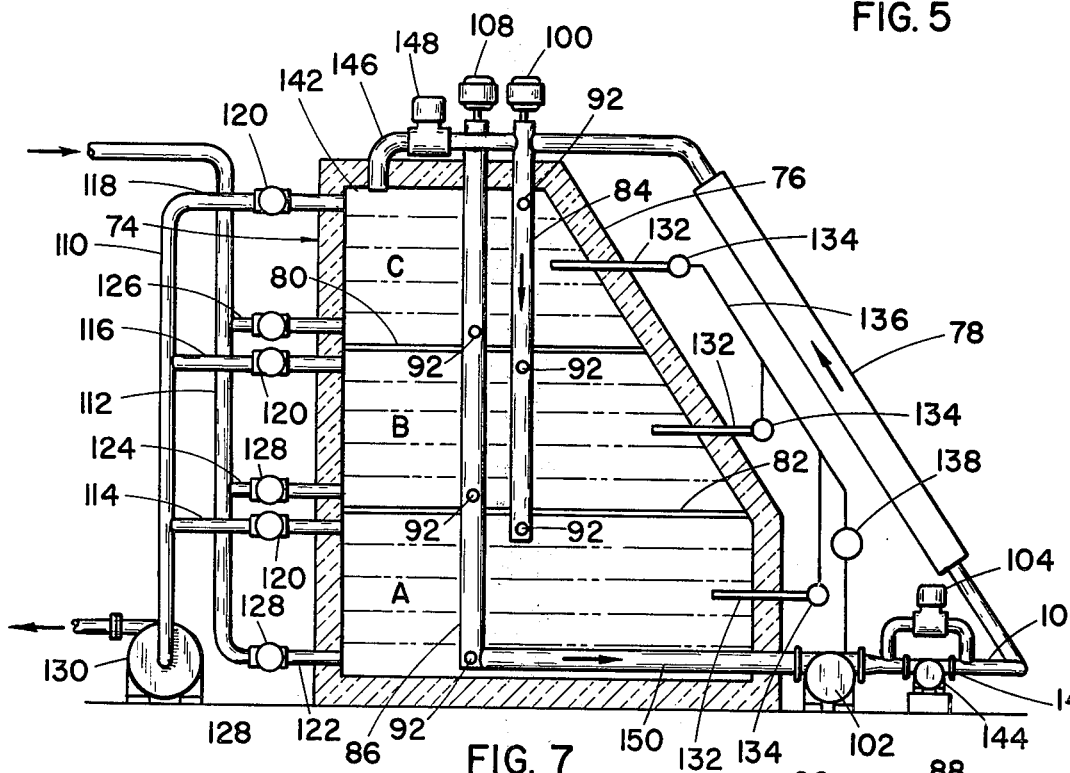
FIG. 7 is a vertical elevation, partly in section, illustrating another embodiment of the system comprising the present invention.

In the arrangement shown in FIG. 7, the tank 74, in cross section, may for example be substantially rectangular in shape and the sidewall 76 thereof is illustrated as sloping similarly to the solar heat collector 78 which, it also will be seen is adjacent the tank 74 rather than being above the level of the tank as shown in the exemplary arrangement shown in FIG. 1. Within the tank 74, there are a plurality of preferably imperforate barrier plates 80 and 82 but it is to be understood that it is not necessary that these barrier plates completely or entirely seal the contents of the respective zones within the tank from circulation of the heat transfer medium therein between the zones. In general however, the arrangement shown in FIG. 7 is adapted for individual operation of the zones independently of each other both in respect to utilizing heat from the solar heat collectors 78 as well as effecting circulation of heat transfer medium between a selected zone and any space heating or cooling system which is interconnected to the inlet and discharge conduits, described hereinafter, which are associated with the tank 74.

Figure 8:
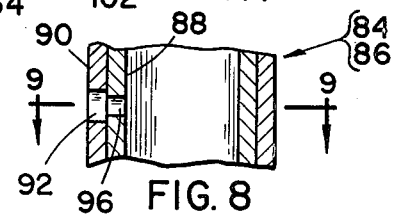
FIG. 8 is a fragmentary vertical section of a detail of some of the valve means employed in the embodiment shown in FIG. 7.
Figure 9:
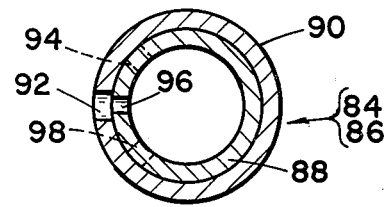
FIG. 9 is a transverse sectional view of the detail shown in FIG. 8 as seen on the line 9—9 thereof.

Circulation of heat transfer medium, such as water, between the various zones A, B and C in the tank 74 and the solar heat collector 78 is accomplished by at least one pair of compound tubular valve units 84 and 86. It will be understood incidentally that the solar heat collector 78 is of the same general type as collector 36 illustrated in conjunction with FIG. 1. The compound tubular valve unit 84 is shorter than the unit 86 as will be seen from FIG. 7. Each of the units however comprise a pair of concentric tubes, including an inner tube 88 and an outer tube 90, as shown in FIGS. 8 and 9. One of the tubes, such as tube 90, is provided with a single opening 92, at three different levels corresponding to the upper portions of the three zones in tank 74. At the same level as the openings 92, the inner tube 88 is provided, for example, with three openings 94, 96 and 98, as shown in FIGS. 8 and 9. Depending upon which of the openings 94, 96 and 98 is brought into registry with opening 92, such as by means of motor 100, which drives one of the tubes while the other remains stationary, liquid heat transfer medium will be discharged into a selected zone A, B or C.

The delivery of the heated liquid heat transfer medium to said zones through the compound tubular valve unit 84 is effected by means of pump 102 which is in circuit with control valve 104 in conduit 106 which leads to the lower end of the solar heat collector 78. Return from the zone selected for such circulation of heat transfer medium is effected by compound tubular valve unit 86 which, as seen from FIG. 7, has a single opening 92 at three different levels in the outer tube 90 thereof, preferably adjacent the lower portion of each of said zones, and motor 108 drives one of the tubes 88 or 90 of the compound unit 86 to connect one of the openings 94, 96 or 98 of the inner tube 90 of unit 86 with the single opening 92 at the level selected for circulation in the desired zone. It will be understood that the motors 100 and 108 operate in unison in a manner to open the openings 92 in each of the tubular valve units 84 and 86 for circulation through a single zone only.

For purposes of distributing the liquid heat transfer medium which is circulated through the various zones of the tank 74 to either a space heating or cooling system connected to the unit shown in FIG. 7, the tank 74 has additional conduits connected thereto for that purpose. In FIG. 7, a pair of substantially vertical conduits 110 and 112 are of sufficient length in a vertical direction to afford connection of branch conduits 114, 116 and 118 respectively to zones A, B and C which respectively have control valves 120 therein to control communication with said zones of tank 74. Similarly, conduit 112 has branch conduits 122, 124 and 126 which have control valves 128 therein and also communicate with the zones A, B and C, respectively at an opposite portion vertically of the zone from where the branch conduits 114, 116 and 188 communicates therewith.

Conduit 110 is connected to a centrifugal pump 130 which operates to withdraw heat transfer medium from the zones A, B and C to direct the same to either a space heating or cooling system, and conduit 112 is connected to the return from said system. The control valves 120 and 128 for the respective zones operate in pairs to circulate a liquid heat transfer medium within a selected zone which is best suited to the load placed upon the heat transfer medium by the space heating or cooling system to which said circulating system is connected.

All of the zones A, B and C have a heat sensor tube or rod 132 extending into the zone, the same supporting a heat-responsive head 134 connected thereto and arranged in an electric circuit 136 operable to control a thermostatic switch 138 which controls the operation of the circulating pump 102 so that when, for example, the temperature within the collector 78 is higher than that in a given zone, said pump can start and the same is stopped when the temperature in a selected zone and the solar heat collector are equalized.

Essentially, in accordance with the operating principles of the system, solar heat is constantly trying to melt the heat storage medium within the cells 48 while the system consumes said heat and in doing so freezes the medium, thereby giving up latent heat of fusion at a substantially constant temperature. Because of such latent heat of fusion of the heat storage medium, much more useful heat at desired temperature levels is stored than if a fluid such as water is used as a heat storage medium.

It is to be understood that in regard to the embodiment shown in FIG. 7, each of the zones A, B and C is provided with, preferably, a plurality of layers of the coiled spiral arrangements 52 of the cells 48. As desired, they may either be separated by the sheets of wire mesh 72 as shown in FIG. 6, as well as the various zones including the alternate diaphragms 66 and 68, depending upon the arrangement which appears to be best suited to the space heating or cooling which is to be accomplished by utilizing the various embodiments of the present invention.

In both embodiments of the invention respectively shown in FIGS. 1 and 7, the level of the heat transfer medium in the uppermost zone in the tank is spaced from the top of the tank in order to provide a space 140 in tank 10 of FIG. 1 and a space 142 in tank 74 of FIG. 7 for purposes of accommodating a gas which preferably is of an inert type, such as nitrogen. This gas primarily is for purposes of venting the solar heat collector to remove the heat transfer medium therefrom under certain conditions. For example, in the embodiment shown in FIG. 1, the solar heat collector 36 preferably is drained of heat transfer medium such as water each time the pump 28 stops following the equalizing of the temperature of the heat transfer medium in the tank 10 in accordance with the demand of the type of system, heating or cooling, with which the tank is associated. When this occurs, the inert gas in the space 140 of tank 10 in FIG. 1 is transmitted by vent tube 143 to the solar heat collector by virtue of vacuum occuring therein after the liquid has been withdrawn from the collector by operation of pump 28.

In the embodiment shown in FIG. 7, a positive displacement pump 144 is arranged in a by-pass conduit 145 which extends around the control valve 104. This pump operates to drain the solar heat collector 78, such as when freezing temperature is imminent when the valve 104 is closed. To facilitate such by-passing and particularly for introducing inert gas from space 142 into the solar heat collector 48, a venting conduit 146 extends from the upper part of tank 74 and communicates with the upper part of solar heat collector 78. A control valve 148 is arranged in the venting conduit 146 to control such operation, actuation of valve 148 being accomplished automatically The liquid drained from the solar heat collector 78 is introduced through the lower conduit 150 into one or more of the zones A, B and C by the manipulation of the tubular valve unit 86 by means of motor 108.

The operation of the several embodiments of thermal storage and heat transfer systems, such as exemplified by FIGS. 1 and 7 in particular, as well as the modifications thereof afforded by the details shown in certain of the other figures, it will be seen that the present invention also includes a method of heating heat transfer medium of a constantly liquid nature efficiently and with a minimum input of power or energy due to the employment of heat storage mediums, preferably of different kinds respectively in the plurality of zones included in the tank of the several embodiments illustrated in the drawings and described above, whereby the phenomenon of developing latent heat of fusion at a substantially constant, discreet temperature in each of the zones permits selecting a circulating temperature best suited to the load of the heating or cooling system with which the thermal storage and heat transfer system of the invention is utilized. Further, at the lower temperature of solar energy which occurs, for example, in the early morning and late afternoon or evening hours, more heat can be captured during such periods than at the higher temperatures and for more hours during the day. Accordingly, the present invention maximizes the use of solar energy by providing, in the several embodiments of systems, means by which heat is collected at three exemplary temperature levels inherent in the different heat storage mediums selected for use in the cells respectively positioned operatively within the different zones within the tanks.

From the foregoing, it will be seen that due to the present invention employing cells of an irregular shape to contain a selected heat storage medium in order that said irregular shapes of the cells may be arranged in compact manner to accommodate a maximum number of said cells in a minimum space within the tanks or zones within the tank, while at the same time providing ample passages between the cells for the circulation of liquid heat transfer medium therethrough, greater efficiency of heating such heat transfer medium with less energy input than is possible by employing systems not including these principles, is achieved.

The foregoing description illustrates preferred embodiments of the invention. However, the concepts employed may, based upon such description, be employed in other embodiments without departing from the scope of the invention. Accordingly, the following claims are intended to protect the invention broadly, as well as in the specific forms shown herein.

I claim:

1. A thermal storage and heat transfer system to utilize solar energy as the source of heat comprising in combination:
   (a) a tank having first and second sets of inlet and discharge ports adjacent opposite ends of said tank,
   (b) a plurality of heat storage cells of irregular shape formed from heat-sealable flexible thermoplastic tubular material transversely sealed at longitudinally spaced locations along said tube sequentially along transverse lines at right angles to each other to provide external passages in all directions therearound when said cells are compactly positioned immediately adjacent each other within said tank due to the irregular shapes thereof,
   (c) heat storage medium sealed within said cells and comprising a chemical capable of changing between liquid and solid state to develop latent heat of fusion temperature,
   (d) a first set of fluid conduits connected respectively to said ports of said first set in said tank and adapted to be connected to a solar heat collector to receive heat therefrom,
   (e) a pump connected in one of said conduits,
   (f) a liquid heat transfer medium contained in said tank and adapted to be circulated by said pump through said passages between said heat storage cells to transfer heat thereto from the heat storage medium in said cells, and
   (g) a second set of conduits attachable to said second set of inlet and discharge ports in said tank to distribute said liquid heat transfer medium to space heating or cooling systems.

2. The system according to claim 1 in which a plurality of layers of said compactly positioned heat storage cells are arranged in stacked relationship within said tank and said layers having passages therebetween for the circulation of said liquid heat transfer medium between said plurality of layers of cells.

3. The system according to claim 2 further including diaphragms disposed transversely in said tank between predetermined layers of said cells, said diaphragms having openings arranged to permit fluid to pass through said diaphragms in a manner to provide circuitous paths for said fluid to facilitate the transfer of heat from said cells to said liquid heat transfer medium.

4. The system according to claim 3 in which the openings in alternate diaphragms are disposed adjacent the rims thereof and the diaphragms therebetween have substantially central openings therein to effect said circuitous paths for said liquid heat transfer medium.

5. The system according to claim 1 in which said cells are in the form of tetrahedrons continously connected to each other along succesive edges which are substantially at the aforesaid right angles to each other, thereby facilitating the arrangement of said cells in flat coiled form to comprise said layers thereof.

6. The system according to claim 1 further in combination with a solar heat collector, and means supporting said heat collector at a level above the top of said tank and the uppermost layer of heat storage cells in said tank being spaced from the upper end thereof to accommodate an inert gas therein adapted to be drawn into said solar heat collector to replace the liquid heat transfer medium drained therefrom when no further heating by solar energy is required incident to the cycle type operation of said system, and a vent conduit for said inert gas extending from the top of said tank to the upper end of said solar heat collector.

7. The system according to claim 6 in which said solar heat collector is disposed at an angle to the horizontal and said system further including a discharge conduit extending from the upper end of said collector to the upper end of said tank for the discharge of heated liquid heat transfer medium into the tank for circulation thereof through said passages between said compactly arranged cells.

8. The system according to claim 1 in which said cells are in the form of irregular solid geometric figures connected at the ends thereof and arranged in a plurality of flat coiled configurations comprising layers thereof, the irregular shapes of said cells being such that no appreciable surface contact between adjacent cells exist in said respective layers.

9. The system according to claim 8 further including horizontally arranged perforated planar members between adjacent layers of said cells to define temperature sections in said tank, said sections each including a plurality of said layers of coiled cells, and said system further including diaphragms between adjacent layers of said cells in said sections, succesive diaphragms having openings therein arranged in staggered relationship to insure extensive passage of said liquid heat transfer medium between said layers of cells in addition to the extensive intimate contact of said liquid heat transfer medium while moving through the passages between adjacent cells.

10. The system according to claim 8 in which said cells are in the form of tetrahedrons fromed from a continuous length of flexible tubular material, said cells being connected by flexible cross members comprising narrow flatened sections of said tube united to each other to form said seals and seal said heat storage medium within said cells and also permit the arrangement of said connected cells in coiled configurations substantially within a common plane as aforesaid.

11. The system according to claim 1 in which said tank is provided with a plurality of parallel horizontal zones respectively comprising at least one layer of said coiled cells, and said cells in each zone respectively having in said cells heat storage medium of different types from the cells in adjacent zones, said different mediums having different temperature levels at a latent heat of fusion to provide a range of different temperatures respectively in said zones, and perforated diaphragms being positioned between said zones to permit at least limited intercommunication therebetween.

12. The system according to claim 1 in which said tank has at least one horizontal barrier plate mounted therein intermediately of the top and bottom of said tank to provide at least two separate zones, and said tank further being provided with first and second conduits extending substantially vertically along all zones of said tank and connectable to heating or cooling systems, said first and second conduits each having branch conduits respectfully connected to said zones of said tank and operable to deliver liquid heat transfer medium to said heating or cooling systems and return said medium to said zones, said branch conduits having independently operable valves between said first and second conduits and said zones to regulate the circulation of liquid heat transfer medium to and from said zones, and said system also including a pump in said first or second conduit which is arranged to deliver said liquid heat transfer medium to said heating or cooling system.

13. The system according to claim 12 further including thermal sensors respectfully connected to each of said zones in said tank, a pump driven by an electric motor, and thermal switch means connected in circuit between said sensors and motor, said pump being disposed in conduit means between one of said valve-like tube sets and one end of said solar heat collector and operable to operate said pump to circulate liquid heat transfer medium between said solar heat collector and any of said zones in which the thermal sensors operate to indicate a need for an increase in temperature in the liquid heat transfer medium in said zone.

14. The system according to claim 1 in which said tank is provided with at least one transverse barrier plate to form two separate horizontal zones therein, in combination with a solar heat collector positioned along one side of said tank, said tank also being provided with distribution and return tubes extending substantially vertically through said zones, conduit means connecting said distribution and return tubes to said solar heat collector, and valves in said conduit means operable to select circulation of liquid heat transfer medium to and from said zones, and a pump connected to said tubes and conduit means to effect such circulation of said liquid heat transfer medium through the zone to which said tubes are connected depending upon the setting of said valves.

15. The system according to claim 14 further including compound tubular units comprising concentric, coaxial tube sets, one of said tubes being rotatable within the other, one of said tubes having one opening disposed therein for each zone in said tank and the other tube having a plurality of openings therein in different circular position, said plurality of openings respectfully communicating with said openings in one tube to comprise valve arrangements operable to control the circulation of liquid heat transfer medium between said zones and said solar heat collector, one of said tube sets being connected to one end of said solar heat collector and the other tube set being connected to the opposite end of said solar heat collector, and means operable to rotate one of said tubes in each of said tube sets simultaneously to establish a selected zone and connect the same in fluid circuit with said solar heat collector.

16. The system according to claim 15 in which said means to operate said rotatable tubes in each set comprise motor means mounted on said tank.

17. The system according to claim 15 in which the conduit means between one of said tube sets and one end of said solar heat collector includes a control valve, and said system further including a by-pass conduit having a pump therein extending around said control valve and operable to drain said solar heat collector when desired, and said system further including a vent valve and conduit between the upper end of said tank and the corresponding end of said solar heat collector to permit circulation of inert gas through said collector to replace liquid heat transfer medium therein such as when the ambient atmosphere is below freezing temperature.

* * * * *